US009928846B2

(12) United States Patent
An et al.

(10) Patent No.: US 9,928,846 B2
(45) Date of Patent: Mar. 27, 2018

(54) METHOD AND ELECTRONIC DEVICE FOR TRACKING AUDIO

(71) Applicant: Samsung Electronics Co., Ltd., Gyeonggi-do (KR)

(72) Inventors: Jungyeol An, Seoul (KR); Namil Lee, Gyeonggi-do (KR); Hochul Hwang, Seoul (KR); Gangyoul Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 295 days.

(21) Appl. No.: 14/567,300

(22) Filed: Dec. 11, 2014

(65) Prior Publication Data

US 2015/0162019 A1 Jun. 11, 2015

(30) Foreign Application Priority Data

Dec. 11, 2013 (KR) .................... 10-2013-0153925

(51) Int. Cl.

| G10L 21/0216 | (2013.01) |
|---|---|
| G10L 21/0208 | (2013.01) |
| H04N 7/15 | (2006.01) |
| H04R 1/32 | (2006.01) |

(52) U.S. Cl.

CPC .......... *G10L 21/0208* (2013.01); *H04N 7/15* (2013.01); *H04R 1/32* (2013.01); *G10L 2021/02166* (2013.01); *H04R 2410/01* (2013.01)

(58) Field of Classification Search

CPC ................. H04R 2410/01; G10L 2021/02166

See application file for complete search history.

(56) References Cited

U.S. PATENT DOCUMENTS

| 5,940,118 A * | 8/1999 | Van Schyndel ........ H04N 7/142 |
|---|---|---|
| | | 348/14.05 |
| 2006/0133623 A1* | 6/2006 | Amir ...................... H04R 3/00 |
| | | 381/92 |

(Continued)

FOREIGN PATENT DOCUMENTS

| KR | 1020100015347 | 2/2010 |
|---|---|---|
| KR | 1020110035162 | 4/2011 |
| KR | 1020120132921 | 12/2012 |

OTHER PUBLICATIONS

Wilson et al. "Audio-video array source separation for perceptual user interfaces." Proceedings of the 2001 workshop on Perceptive user interfaces. ACM, 2001.*

(Continued)

*Primary Examiner* — Samuel G Neway
(74) *Attorney, Agent, or Firm* — The Farrell Law Firm, P.C.

(57) ABSTRACT

A method and an electronic device for tracking audio are provided. The method includes generating video data by obtaining an external image; extracting an object included in the image from the video data; and controlling an audio reception unit to receive an audio signal based on the extracted object. The electronic device includes a video processing unit configured to generate video data by obtaining an external image; an audio reception unit configured to receive an audio signal; and a controller configured to extract an object included in the image from the video data, and control the audio reception unit based on the extracted object.

21 Claims, 9 Drawing Sheets

(56) References Cited

U.S. PATENT DOCUMENTS

| | | | |
|---|---|---|---|
| 2009/0174805 A1* | 7/2009 | Alberth, Jr. | H04N 5/23212 348/345 |
| 2010/0026780 A1* | 2/2010 | Tico | G06T 7/2033 348/14.02 |
| 2010/0110232 A1* | 5/2010 | Zhang | H04N 5/23212 348/240.3 |
| 2010/0245624 A1* | 9/2010 | Beaucoup | H04N 5/772 348/231.4 |
| 2010/0272363 A1 | 10/2010 | Steinberg et al. | |
| 2010/0315528 A1* | 12/2010 | Goh | H04N 5/23219 348/222.1 |
| 2011/0085061 A1* | 4/2011 | Kim | H04N 5/232 348/240.99 |
| 2012/0082322 A1 | 4/2012 | van Waterschoot et al. | |
| 2012/0197638 A1 | 8/2012 | Li et al. | |
| 2012/0327115 A1* | 12/2012 | Chhetri | H04R 3/005 345/633 |
| 2014/0029761 A1* | 1/2014 | Maenpaa | H04R 3/005 381/92 |
| 2015/0162019 A1* | 6/2015 | An | H04R 1/32 704/226 |

OTHER PUBLICATIONS

Asano et al., "Fusion of Audio and Video Information for Detecting Speech Events", Proceedings of the Sixth International Conference of Information Fusion, Jul. 8, 2003.

European Search Report dated Apr. 7, 2015 issued in counterpart application No. 14197313.1-1910.

\* cited by examiner

FIG. 9

US 9,928,846 B2

METHOD AND ELECTRONIC DEVICE FOR TRACKING AUDIO

PRIORITY

This application claims priority under 35 U.S.C. § 119(a) of a Korean Patent Application filed on Dec. 11, 2013 in the Korean Intellectual Property Office and assigned Serial No. 10-2013-0153925, the entire contents of which are incorporated herein by reference.

BACKGROUND

1. Field of the Invention

The present invention relates generally to a method and a device for tracking audio, and more particularly, to a method and a device for removing noise from an externally received audio input by utilizing video data.

2. Description of the Related Art

Recently, due to a rapid increase in the penetration rate of various electronic devices, electronic devices became necessities of modern life. A portable terminal is an example of such an electronic device. The portable terminal can provide various video services as well as a call service.

Such call service and video service can be provided by receiving an audio signal externally via a microphone (MIC) of the portable terminal. In order to obtain a signal and information desired by a user from the received signal, the portable terminal can remove noise from the externally received signal.

In a conventional technique, it is difficult to correctly receive a signal desired by a user, because the removal of the audio noise can only be achieved using the signal input via a microphone. In addition, when removing audio noise, a portable terminal can set a range of beamforming of multi-microphones.

When the beamforming of multi-microphones mounted in a portable terminal is set broadly, a call quality may be reduced or a recognition rate may be reduced if the noise is not sufficiently removed. Alternatively, when the beamforming of multi-microphones mounted in a portable terminal is set narrowly, there is a problem in that the signal desired by a user is removed along with the noise.

SUMMARY

The present invention has been made to address the above-mentioned problems and disadvantages, and to provide at least the advantages described below. Accordingly, an aspect of the present invention provides a method and an electronic device for tracking audio.

In accordance with an aspect of the present invention, a method of tracking audio is provided. The method includes generating a video data by obtaining an external image; extracting an object included in the image from the video data; and controlling an audio reception unit to receive an audio signal based on the extracted object.

In accordance with another aspect of the present invention, an electronic device includes a video processing unit configured to generate a video data by obtaining an external image; an audio reception unit configured to receive an audio signal; and a controller configured to extract an object included in the image from the video data, and control the audio reception unit based on the extracted object.

BRIEF DESCRIPTION OF THE DRAWINGS

The foregoing and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Embodiments of the present invention are described with reference to the accompanying drawings in detail. The same reference numbers are used throughout the drawings to refer to the same or like parts. Detailed descriptions of well-known functions and structures incorporated herein are omitted to avoid obscuring the subject matter of the present invention.

Prior to a detailed description of the present invention, terms and words used in the specification and the claims shall not be interpreted as commonly-used dictionary meanings, but shall be interpreted as to be relevant to the technical scope of the invention based on the fact that the concept of the terms can be defined to explain the invention the in best way. Therefore, the embodiments of the present invention and the configurations depicted in the drawings are for illustrative purposes only and do not represent all technical scopes of the present invention, so it should be understood that various equivalents and modifications can exist. Some constituent elements shown in the drawings can be exaggerated, omitted or schematically drawn for the purpose of convenience or clarity. In addition, the size of elements does not utterly reflect an actual size. Accordingly, the present invention is not limited to a relative size and interval shown in the accompanying drawings.

Unless defined otherwise, the terms including technical and scientific terms used in this specification can have the meaning that can be commonly apprehended by those skilled in the art. The terms, such as the terms defined in the commonly-used dictionary, must be interpreted based on the context of the related technology and must not be interpreted ideally or excessively. It should also be noted that in some alternative implementations, the functions/acts noted in the blocks can occur out of the order noted in the flowcharts. For example, two blocks shown in succession can in fact be executed substantially concurrently or the blocks can sometimes be executed in the reverse order, depending upon the functionality/acts involved.

It can be understood that each block of the flowcharts and a combination of the flowcharts can be performed by computer program instructions. Since computer program instructions can be loaded into a processor of a universal computer, a special computer or other programmable data processing equipment, instructions performed via a processor of a computer or other programmable data processing equipment generates means for performing functions described in block(s) of the flowcharts. Since the computer program instructions can be stored in a computer available or computer readable memory capable of configuring a computer or other programmable data processing equipment to implement functions in a scheme, instructions stored in the computer available or computer readable memory can produce manufacturing articles involving an instruction means executing functions described in block(s) of the flowcharts. Because the computer program instructions can be loaded onto a computer or other programmable data processing equipment, a series of operational steps are performed in the computer or other programmable data processing equipment to create a process executed by the computer or other programmable data processing equipment such that instructions performing by the computer or other programmable data processing equipment can provide steps for executing functions described in block(s) of the flowcharts.

Further, each block can indicate a part of a module, a segment, or a code including at least one executable instruction for executing specific logical function(s). It should be noted that several execution examples can generate functions described in blocks out of order. For example, two contiguously shown blocks can be simultaneously performed, and the blocks can be performed in a converse order according to corresponding functions.

While the present invention is susceptible to various modifications and alternative forms, embodiments thereof are shown by way of example in the drawings and will herein be described in detail. In the embodiments of the present invention, some parts can be omitted if technical contents which are already known to a person of ordinary skill in the art are not related to the technical subject matter.

In addition, an electronic device of the present invention can include a mobile phone, a smart phone, a laptop computer, a digital broadcasting terminal, a Personal Digital Assistant (PDA), a Portable Multimedia Player (PMP), a navigation device, and the like. However, for convenience of explanation, a portable terminal 100 is illustrated as an example of the electronic device. However, the embodiments of the present invention described below are not limited to the portable terminal 100.

Figure 1:
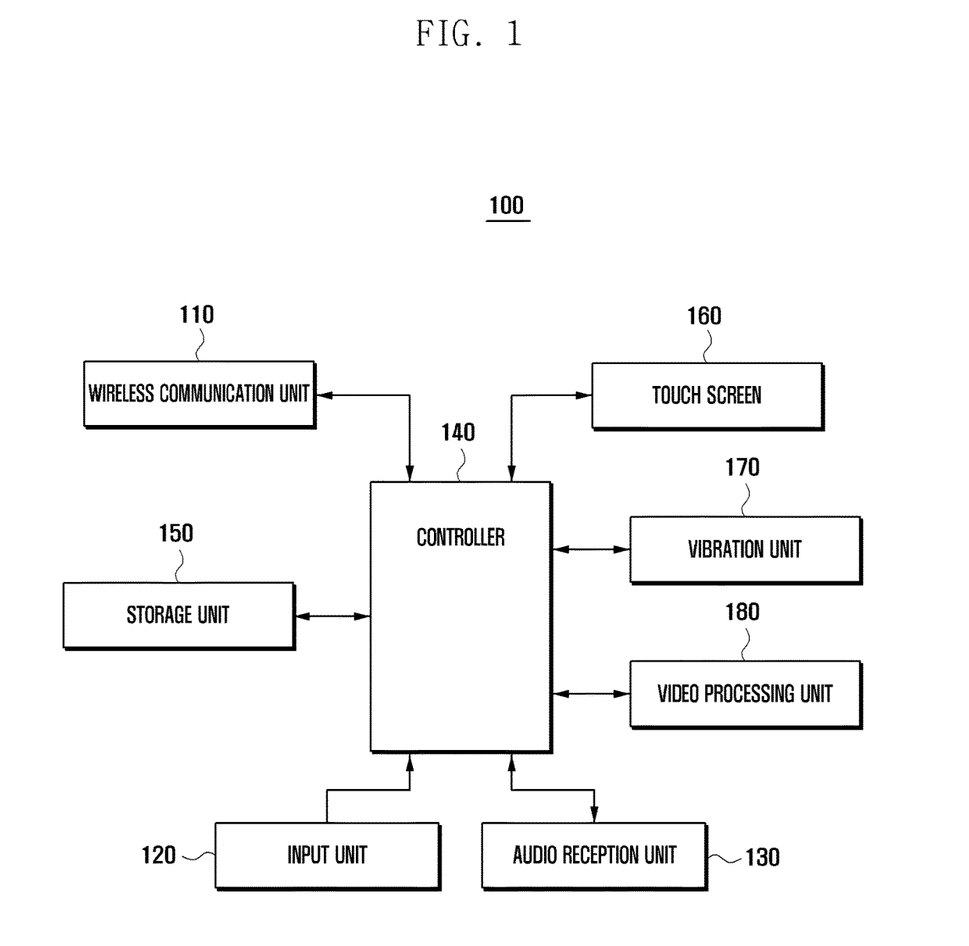
FIG. 1 is a block diagram illustrating a portable terminal according to an embodiment of the present invention.

FIG. 1 is a block diagram of a portable terminal 100 according to an embodiment of the present invention.

Referring to FIG. 1, the portable terminal 100 includes a wireless communication unit 110, an input unit 120, an audio reception unit 130, a controller 140, a storage unit 150, a touch screen 160, a vibration unit 170, and a video processing unit 180.

The wireless communication unit 110 is a communication module for supporting a mobile communication service of the portable terminal 100. The wireless communication unit 110 can form a communication channel with the mobile communication system. To this end, the wireless communication unit 110 can include a wireless frequency transmission unit for up-converting and amplifying a frequency of a transmitted signal, and a reception unit for low-noise amplifying and down-converting a frequency of a received signal.

In addition, the wireless communication unit 110 can include one or more modules which enable a wireless communication between the portable terminal 100 and a wireless communication system or between the portable terminal 100 and a network in which another portable terminal 100 is located. For example, it can include a broadcast reception module, a mobile communication module, a wireless internet module, a short-range communication module, and a location information module.

The input unit 120 can include a plurality of input keys and function keys for receiving number or character information and setting various functions. The function keys can include a direction key, a side key, and a shortcut key set to perform a specific function. In addition, the input unit 120 can generate a key signal related to a user setting and a function control of the portable terminal 100 and transmit to the controller 140.

According to an embodiment of the present invention, the audio reception unit 130 includes a microphone (MIC) for collecting an audio signal according to the activation of a specific application of the portable terminal 100. In addition, the audio reception unit 130 can include a plurality of microphones as well as one microphone. The controller 140 can process the audio signal inputted to the audio reception unit 130 to remove noise from the audio signal.

Further, according to an embodiment of the present invention, the audio reception unit 130 can receive and obtain an audio signal relating to an external object 200 described below, an image, a body, an animal, and a phonating entity.

Figure 2:
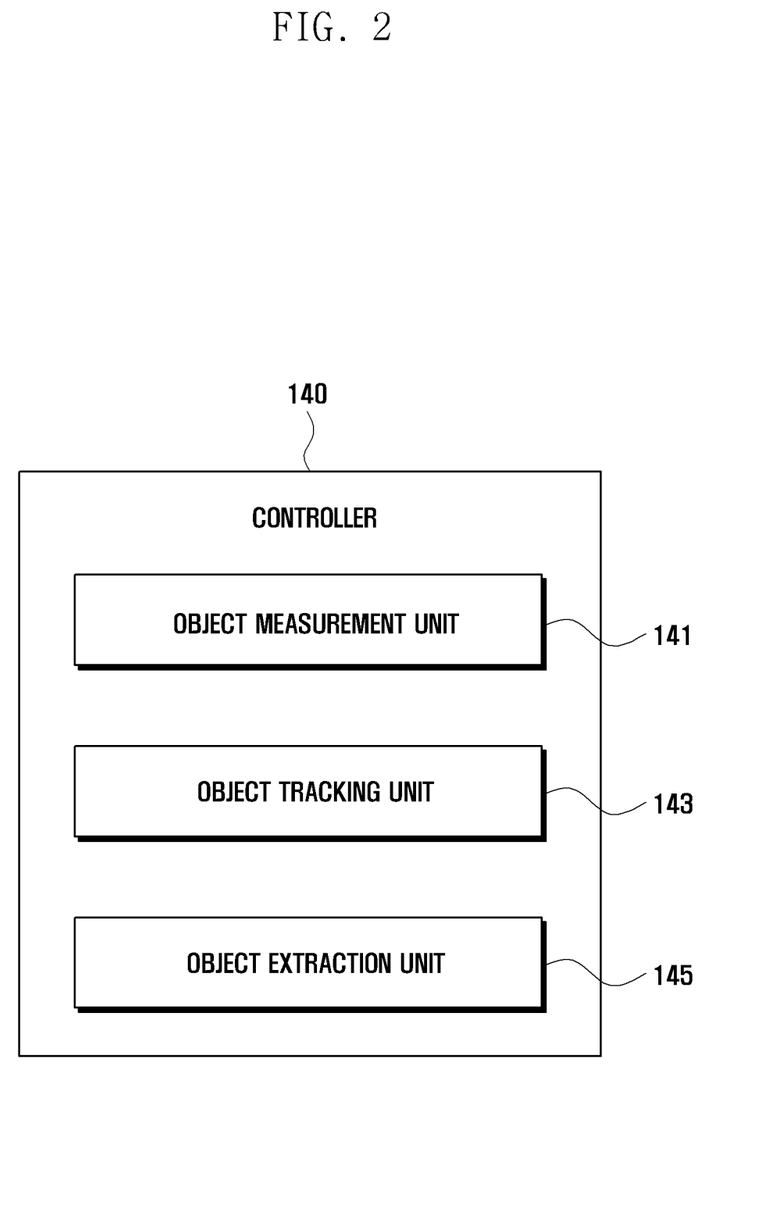
FIG. 2 is a block diagram of a controller of FIG. 1 according to an embodiment of the present invention.

FIG. 2 is a block diagram illustrating the controller 140 of FIG. 1 according to an embodiment of the present invention. The controller 140 can control a power supply to each configuration of the portable terminal 100, perform an initialization process, and control each configuration when the initialization process is completed.

FIGS. 3 to 6 are diagrams illustrating an object 200 of a touch screen 160 according to an embodiment of the present invention. According to an embodiment of the present invention shown in FIG. 2, the controller 140 includes an object measurement unit 141, an object tracking unit 143, and an object extraction unit 145.

The object measurement unit 141 measures at least one of location information of an object 200, movement information, and number information of the object 200. Referring to FIGS. 1 to 6, the information related to the location of the object 200, the movement, and the number of the object 200 can include information measured by using a Global Positioning System (GPS), a satellite communication, and a short-distance communication module.

The movement information of the object 200 can be measured by using the movement information according to a change of the object 200 for a given unit area. In addition, the movement information of the object 200 can be measured through calculation and comparison of pixel change of a corresponding area. The number of object 200 can be measured by previously storing a ratio of object 200 according to a distance measurement into the portable terminal 100 and comparing the pre-stored ratios.

The object tracking unit 143 tracks and updates information related to the object 200 based on the measured information. The tracking of information related to the object 200 can include a method of tracking and identifying the information related to the object 200 by calculating the moving direction and speed of the object. In addition, the update of the object can include a method of updating the information of object 100 by a pre-stored method, or arbitrarily adjusting the update time of the information of object 100 by a user.

The object extraction unit 145 tracks and updates the object 200, and extracts an object 200 from an image corresponding to video data. In this case, the object 200 can be selected by a pre-stored method, or can be arbitrarily selected by the user.

In addition, the controller 140 can receive a selection input for a selection area 210 displayed by a touch screen 160, and select the object 200 based on the received selection input. The reception of the selected input can include a method of automatically selecting the object by a pre-stored method, or a method of receiving a selection input by user touch, or the like. According to an embodiment of the present invention, the controller 140 can determine whether the object 200 which is selected in accordance with the reception of the selection input is singular. Then, the controller 140 can determine whether the object 200 is positioned within a preset first location image area 300 of the touch screen 160, when the selected object 200 is singular. In this case, the first location image area 300 can be a range designated by the user, or can be a range previously stored in a form of a database to be adjusted to the portable terminal 100, the type of the audio reception unit 130, and the characteristic of multi-microphone.

According to an embodiment of the present invention, when the object 200 is positioned within the preset first location image area 300 among the video data, the audio reception unit 130 can be set to be unidirectional to enhance an audio recognition ratio for object 200 contrast to image.

In this case, the setting of directivity to enhance an audio recognition ratio for the displayed object 200 contrast to image indicates that a weight (unidirectional parameter of a multi-microphone) is enhanced in comparison with other audio data, with respect to the audio output generated by the user's selection input, or generated from the object designated automatically by a pre-stored method. This indicates that the beamforming area of a multi-microphone is decided to be unidirectional.

Further, according to an embodiment of the present invention, such determined information indicates that a parameter related to the directivity of multi-microphone is set.

In this case, the parameter of a multi-microphone can be divided into a unidirectional parameter and a non-directional parameter. First, in the unidirectional parameter type of multi-microphone, since the multi-microphone of a transmission-side transmits an electromagnetic beam, a signal, or the like in one direction, the unidirectional parameter type of multi-microphone indicates that the multi-microphone of the transmission-side and the multi-microphone of a receiving-side are exactly arranged.

The unidirectional parameter of a multi-microphone is a parameter that enhances a concentration of an audio signal of the object 200, a weighting, and an audio recognition rate. Further, the unidirectional parameter of a multi-microphone can set, and process to emphasize, an audio signal of the object 200 in contrast to another externally received signal or to occupy a larger ratio.

The non-directional parameter of a multi-microphone indicates that the transmitted signal is spread in all directions. The non-directional parameter can set and process audio data of all objects 200 to a given recognition rate, without distinction of an audio signal output from an object 200 and another audio signal. Further, the non-directional parameter can set and process the audio signal output from an object 200 and another audio signal externally received and inputted to the same ratio.

According to an embodiment of the present invention, when it is determined that the object 200 is not located within a previously set first location image area 300, the controller 140 can set the audio reception unit 130 to be non-directional so that the audio recognition rate for a displayed object 200 in contrast to image can be uniformly maintained. In an embodiment of the present invention, when it is determined that the object 200 is not located within the previously set first location image area 300, the controller 140 can set the multi-microphone to the non-directional parameter.

According to an embodiment of the present invention, the controller 140 can determine whether the object 200 is singular or plural, and can decide the audio reception unit 130 to be non-directional so that the audio recognition rate for the displayed object 200 in contrast to image can be uniformly maintained when the selected object 200 is plural.

Further, in an embodiment of the present invention, the controller 140 can determine whether the selected object 200 is singular, and can set the multi-microphone as a non-directional parameter type, when the selected object 200 is plural.

In addition, according to an embodiment of the present invention, the controller 140 can perform a control of the audio reception unit 130 after a process of receiving a selection input of a switching mode according to a separate user input. The switching mode can be executed by including an operation of touching and inputting an application or a key according to a user's selection.

In this case, the switching mode is a mode which is operated when a user wants to use, together with a video data device such as a camera, a camcorder and a video processing unit capable of receiving video data by the user, when receiving a signal, information, video information, audio information, and the like externally or over a distance.

The controller 140 can receive a selection of a switching mode before obtaining an external image and generating the video data. The reception of the selection of switching mode of the controller 140 can include an operation of utilizing the video data when removing audio noise.

The storage unit 150 can store an application for playing various stored files, and a key map or a menu map, and the like for operating the touch screen 160, as well as applications for the process of function according to an embodiment of the present invention. In this case, the key map and the menu map can have various forms, respectively.

That is, the key map can be a keyboard map, a 3*4 key map, a QWERTY key map, and the like, and can be a control key map for controlling operation of the application that is currently activated. In addition, the menu map can be a control key map for controlling operation of the application that is currently activated. In addition, the menu map can be a menu map for controlling operation of the application that is currently activated, and can be a menu map having items of various menus provided by the portable terminal 100. Such storage unit 150 can include a program area and a data area.

The program area can store an Operating System (OS) for booting the portable terminal 100 and operating the above-mentioned respective configurations, and an application for executing various files, such as an application for supporting a call function according to the function supported by the portable terminal 100, a web browser to connect to an Internet server, a Moving Picture Experts Group Audio Layer 3 (MP3) application for playing another sound source, an image output application for displaying photos, a video playing application, and the like. In addition, the program area can store a video program and an audio program according to an embodiment of the present invention. The video program can be a program which stores and controls a received video.

The data area is an area in which data generated according to the use of the portable terminal 100 is stored, and can store phone book information, at least one icon according to a widget function, and various contents. In addition, the data area can store a user input inputted via the touch screen 160 when the data area is implemented in the touch screen 160.

The touch screen 160 displays information inputted by the user or information provided to the user, as well as various menus of the portable terminal 100. That is, the touch screen 160 can provide various screens according to the use of the portable terminal 100, such as a standby screen, a menu screen, a message writing screen, and a call screen. The touch screen 160 can be formed of a Liquid Crystal Display (LCD), and an Organic Light Emitted Diode (OLED), and the like, and can be included in an input means. Further, a touch sensor can be disposed on a display panel where status can be provided. In addition, the portable terminal 100 can provide various menu screens that can be performed based on the touch screen 160 according to the support of the touch screen 160.

Figure 3:
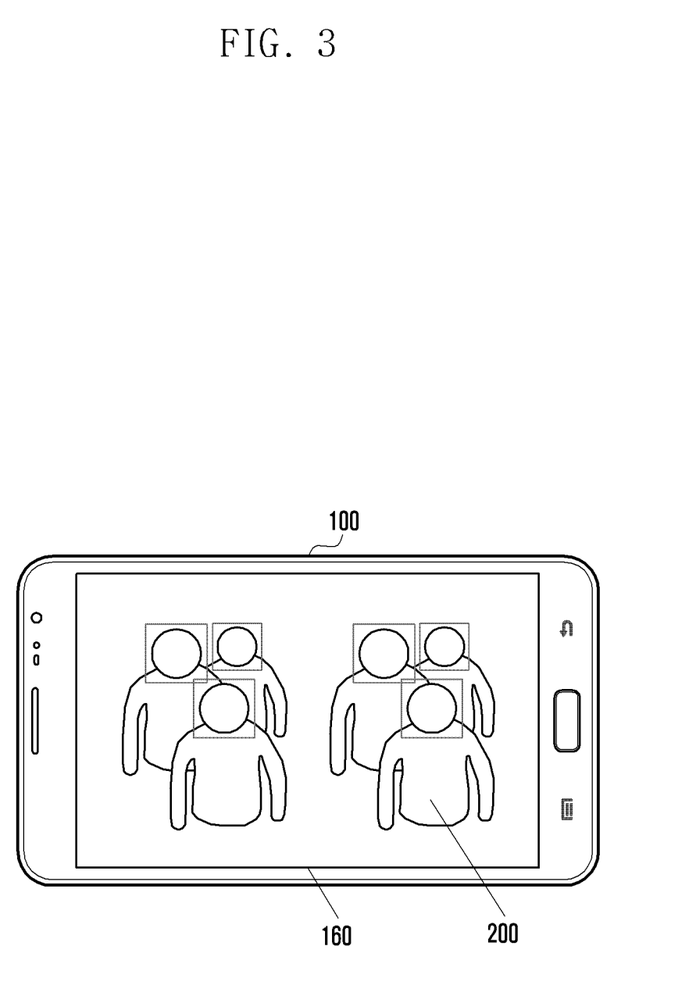
FIG. 3 is a diagram illustrating an object of a touch screen according to an embodiment of the present invention.

According to an embodiment of the present invention, the touch screen 160 can display an image as shown in FIG. 3. In addition, the touch screen 160 can display the selection area 210, shown in FIG. 4, differentiated from the image displayed in the object 200.

Further, according to an embodiment of the present invention, the touch screen 160 can display the screen even if the object 200 is not included. However, the touch screen 160 can emphasize the object 200 part and further display the selection area 210, when the object 200 is included. The operation of emphasizing the object 200 part can include an operation of emphasizing a part of the object 200 or an entire area of the object 200.

Figure 4:
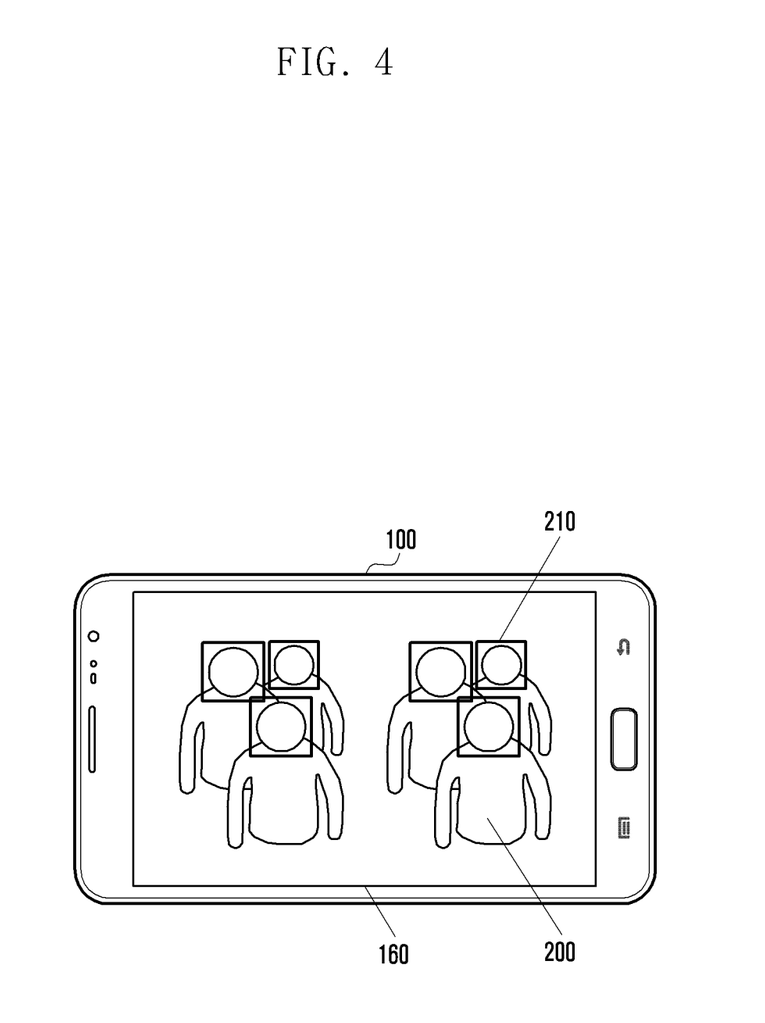
FIG. 4 is a diagram illustrating an object of a touch screen according to an embodiment of the present invention.
Figure 5:
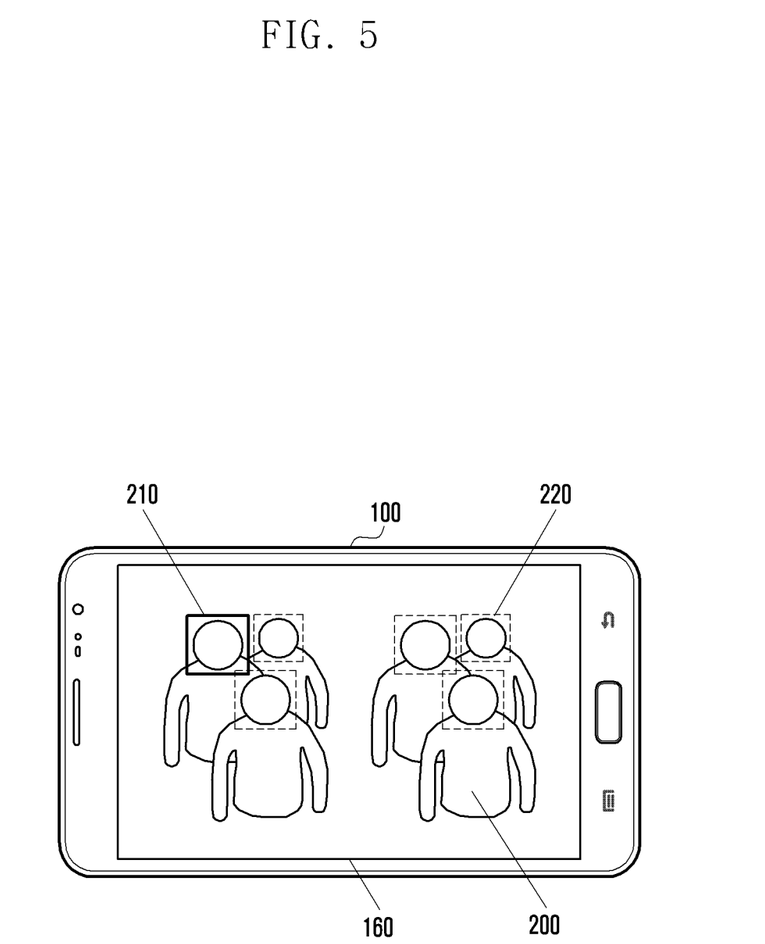
FIG. 5 is a diagram illustrating an object of a touch screen according to an embodiment of the present invention.

In addition, as shown in FIGS. 4 and 5, the touch screen 160 can display the selection area 210 to emphasize the part of the object 200 desired by a user. The selection area 210 can be displayed by receiving a selection input of the user or by automatically emphasizing the selection area 210 by a pre-stored method. In addition, the touch screen 160 can display a non-selection area 220 as shown in FIG. 5. In addition, the distinction of the selection area 210 and the non-selection area 220 can be determined by receiving a selection input of the user or can include a distinction according to a preset method.

Further, according to an embodiment of the present invention, the difference between the selection area 210 and the non-selection area 220 can include a difference of color between both objects 200, a difference of a thickness or types of border, and an operation of differently displaying with a different size of the object 200 according to a selection of the object 200. Further, it can include an operation of being identical with an image corresponding to video data which displays nothing.

The vibration unit 170 performs various vibrations under the control of the controller 160 and, to this end, can include at least one vibration motor. The vibration unit 170 can be activated when a call signal is received or an alarm time comes in a silent vibration mode according to a user setting.

The video processing unit 180 includes a video receiving device for receiving and obtaining a video signal, a camera signal, and a camcorder signal. According to an embodiment of the present invention, the video processing unit 180 can be positioned on at least one of a front side or a rear side of the portable terminal 100, and can receive video, image information, and the like externally to transmit to the controller 140.

In addition, the video processing unit 180 can obtain various images under the control of the controller 160. The video processing unit 180 can generate video data based on the obtained image. Referring to FIGS. 1 to 6, the video processing unit 180 can serve as a camera, and, moreover, can record video, record a series of still photo, and function as a camcorder.

Figure 6:
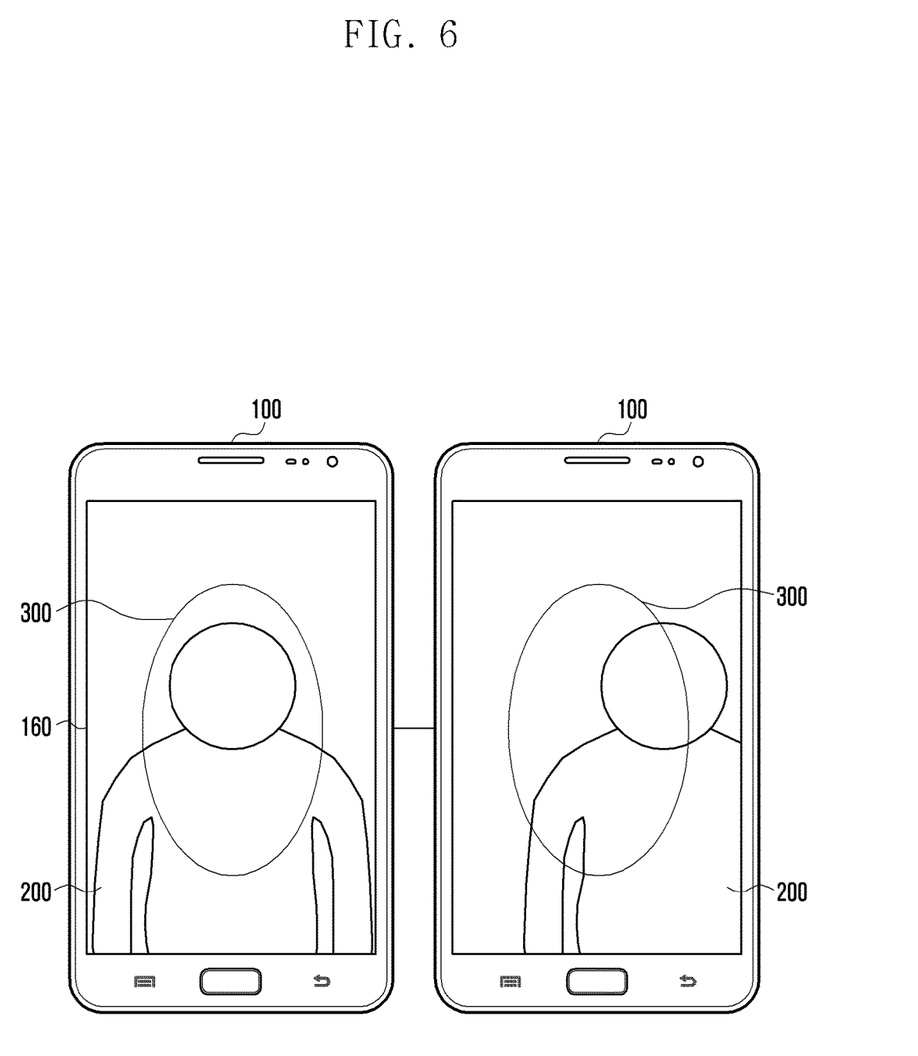
FIG. 6 is a diagram illustrating an object of a touch screen according to an embodiment of the present invention.

FIG. 6 is a diagram illustrating an object 200 displayed on a touch screen 160 of a portable terminal 100 according to an embodiment of the present invention.

When the number of selected object 200 is singular, the controller 140 determines whether the object 200 is positioned within the preset first location image area 300 of the touch screen 160.

When the selected object 200 is singular and positioned within the first location image area 300, the controller 140 sets the audio reception unit 130 to be unidirectional to enhance an audio recognition ratio for the displayed object 200 in contrast to the image. This indicates that the beamforming area of a multi-microphone is set to the unidirectional parameter.

The controller 140 sets the beamforming area of a multi-microphone with the non-directional parameter, when the object 200 is not singular or not positioned within the first location image area 300.

According to an embodiment of the present invention, the user can designate a range of the above-mentioned first location image area 300. In addition, in order to set the parameter of a multi-microphone, the first location image area 300 can be divided into stages such as a second range, a third range, and the like. The beamforming area of the multi-microphone can be set according to the divided second range and third range. In addition, the first location image area 300 can be previously selected or designated by the user.

Figure 7:
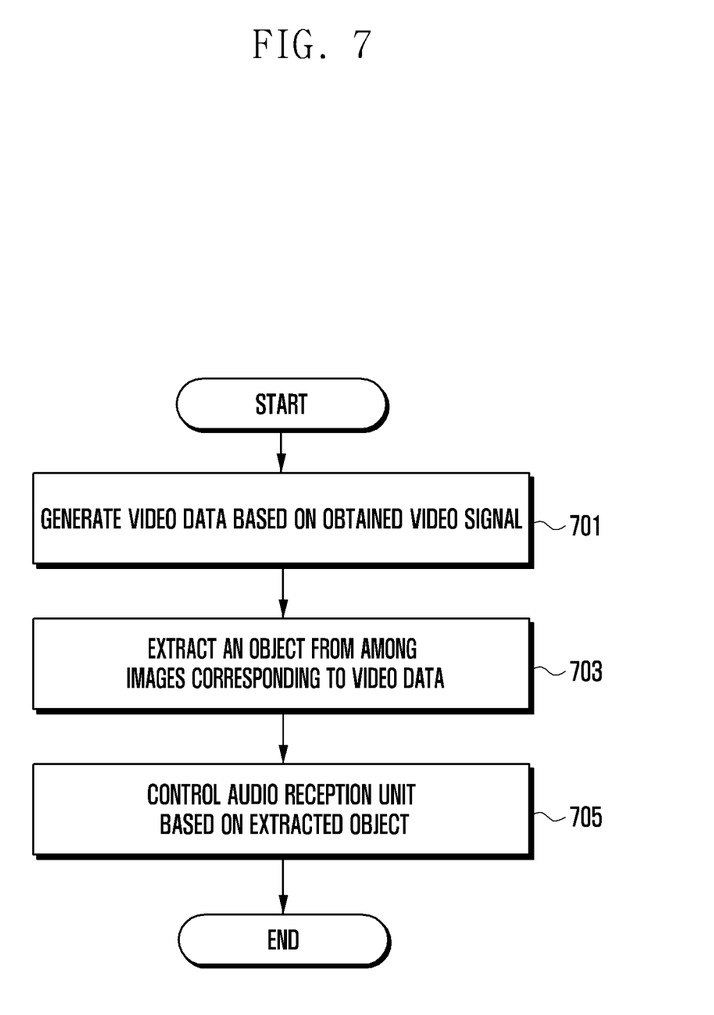
FIG. 7 is a flowchart for removing audio noise according to an embodiment of the present invention.

FIG. 7 is a flowchart for removing audio noise according to an embodiment of the present invention.

Referring to FIG. 7, the video processing unit 180 obtains an external video signal. At step 701, the video processing unit 180 generates video data based on the obtained video signal. At step 703, the controller 140 of the portable terminal 100 extracts an object 200 from among the images corresponding to the video data. The object 200 is the object 200 which is decided by a method of comparing with a database previously stored in the storage unit 150.

At step 705, the controller 140 controls the audio reception unit 130 based on the extracted object 200. This indicates that the beamforming area of the multi-microphone is set to be unidirectional or non-directional.

Figure 8:
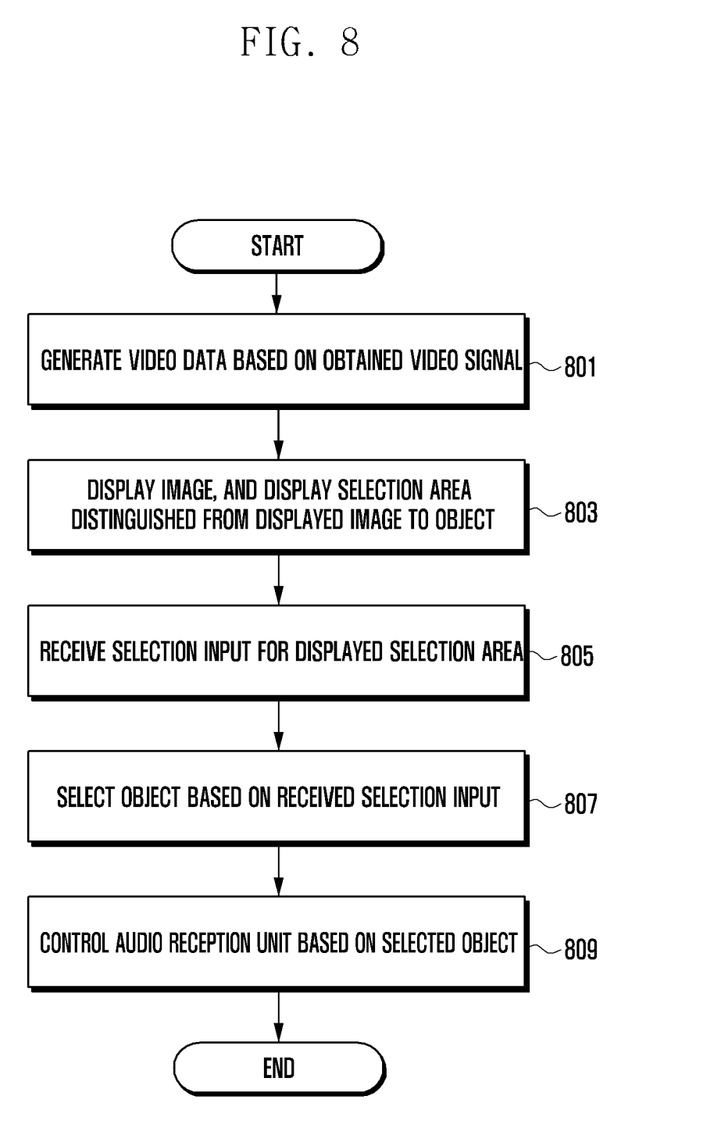
FIG. 8 is a flowchart for removing audio noise according to an embodiment of the present invention.

FIG. 8 is a flowchart for removing audio noise according to an embodiment of the present invention.

Referring to FIG. 8, the video processing unit 180 obtains an external video signal. At step 801, the video processing unit 180 generates video data based on the obtained video signal. At step 803, the touch screen 160 displays an image and the selection area 210 distinguished from the displayed image of the object 200. The selection area 210 can be displayed by emphasizing a part or an entire area in which the object 200 is positioned.

The touch screen 160 receives a selection input for the displayed selection area 210 at step 805. The selection area 210 is selected by a touch, an input of a user, or is automatically selected by a pre-stored method. As the touch screen 160 receives the selection input, the selection area 210 and the non-selection area 220 are reset.

At step 807, the controller 140 selects the object 200 based on the received selection input. At step 809, the controller 140 controls the audio reception unit 130 based on the selected object 200. For example, the controller 140 can select the beamforming area of the multi-microphone to be unidirectional or non-directional.

Figure 9:
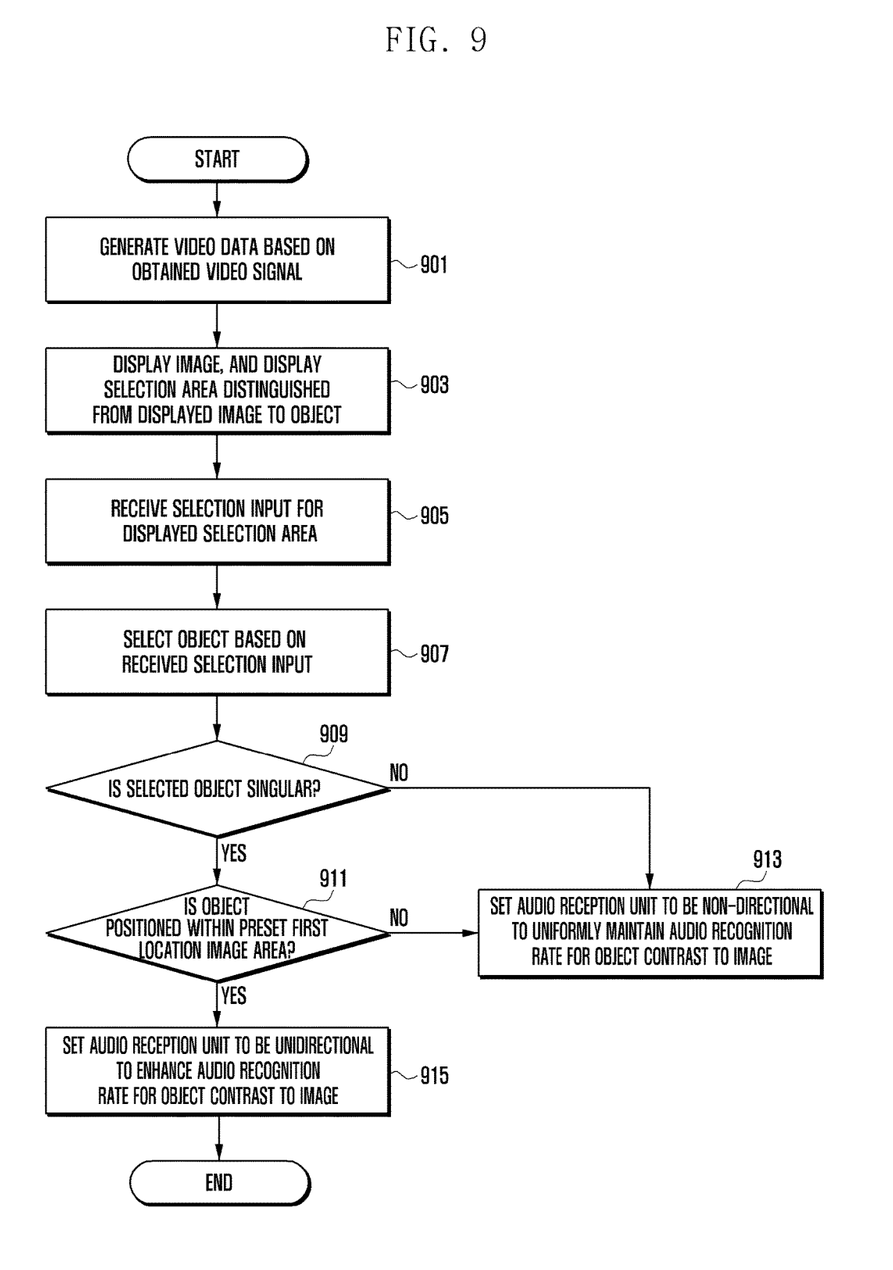
FIG. 9 is a flowchart for removing audio noise according to an embodiment of the present invention.

FIG. 9 is a flowchart for removing audio noise according to an embodiment of the present invention.

Referring to FIG. 9, the video processing unit 180 obtains an external video signal. At step 901, the video processing unit 180 generates video data based on the obtained video. At step 903, the touch screen 160 displays an image and the selection area 210 distinguished from the displayed image of the object 200. The selection area 210 can be displayed by emphasizing a part or an entire area in which the object 200 is positioned.

The touch screen 160 receives a selection input for the displayed selection area 210 at step 905. The selection area 210 can be selected by a touch, an input of a user, or is automatically selected by a pre-stored method. When the touch screen 160 receives the selection input, the selection area 210 and the non-selection area 220 are reset.

At step 907, the controller 140 selects the object 200 based on the received selection input. At step 909, the controller 140 checks whether the selected object 200 is singular. When the selected object 200 is singular, the controller 140 determines whether the object 200 is positioned within the preset first location image area 300 at step 911.

At step 913, when it is determined that the selected object 200 is not singular (i.e., is plural), or the object 200 is not positioned within the preset first location image area 300, the controller 140 sets the audio reception unit 130 to be non-directional so that the audio recognition rate for the displayed object 200 in contrast to image can be uniformly maintained.

Further, for example, at step 913, when it is determined that the selected object 200 is not singular (i.e., is plural), or the object 200 is not positioned within the preset first location image area 300, the controller 140 selects the beamforming area of the multi-microphone to be non-directional.

On the other hand, when it is determined that the object 200 is singular and positioned within the preset first location image area 300, the controller 140 sets the audio reception unit 130 to be unidirectional so that the audio recognition rate for the displayed object 200 in contrast to the image can be enhanced at step 915. This indicates that the beam forming area of the multi-microphone is set to be unidirectional.

The portable terminal 100, according to an embodiment of the present invention, can use an external video signal, and analyze the number of an object (such as a speaker, a face, and an entity having a signal desired by a user, hereinafter, referred to as an "object"), a location of an object, and direction information of an object, so that it is possible to improve the call quality and the recognition rate of the object, and to record a user's customized recording.

In addition, the portable terminal 100, according to an embodiment of the present invention, may not apply a single parameter of a multi-microphone, but may apply a different parameter for each situation to increase the removal of audio noise.

Further, the portable terminal 100, according to an embodiment of the present invention, can determine that the location of the object is not changed by using the video information, even if a surrounding signal having a large strength is detected rather than the signal of the object desired by the user, thereby improving and upgrading noise removal.

Although embodiments of the present invention have been described in detail hereinabove, it should be clearly understood that many variations and modifications of the present invention taught herein which can appear to those skilled in the present art will still fall within the spirit and scope of the present invention, as defined in the appended claims, and their equivalents.

What is claimed is:

1. A method of tracking audio by an electronic device, the method comprising:
generating video data by obtaining an external image;
extracting at least one object included in the external image from the video data;
determining a number of the at least one extracted object;
determining, when the number of the at least one extracted object is one, a location of the at least one extracted object in the external image; and
controlling an audio reception unit to receive an audio signal based on at least one of the number of the at least one extracted object or the location of the at least one extracted object,
wherein controlling the audio reception unit comprises setting the audio reception unit to be non-directional when the number of the at least one extracted object is two or more.

2. The method of claim 1, wherein the audio reception unit comprises a plurality of microphones.

3. The method of claim 2, further comprising:
displaying the external image; and
displaying a selection area for selecting the extracted object.

4. The method of claim 3, further comprising:
receiving a selection input for the displayed selection area,
wherein extracting the object comprises selecting the object based on the received selection input.

5. The method of claim 2, wherein extracting the object comprises:
measuring at least one of location information, movement information, and number information of the object;
tracking and updating the object based on the measured at least one of location information, movement information, and the number information of the object; and
extracting the object included in the external image by tracking and updating the object.

6. The method of claim 2, wherein determining the location of the at least one extracted object comprises determining if the at least one extracted object is positioned within a preset location image area.

7. The method of claim 6, wherein controlling the audio reception unit comprises setting the audio reception unit to be unidirectional for enhancing an audio recognition ratio for the extracted object compared with an audio recognition ratio of the external image when the extracted object is positioned within the preset location image area.

8. The method of claim 6, wherein controlling the audio reception unit comprises setting the audio reception unit to be non-directional for providing an audio recognition rate of the extracted object equal to an audio recognition rate of the external image when the extracted object is not positioned within the preset location image area.

9. The method of claim 2, wherein controlling the audio reception unit further comprises controlling the audio reception unit when a call function is executed in the electronic device.

10. The method of claim 2, wherein controlling the audio reception unit further comprises controlling the audio reception unit when a video recording function is executed in the electronic device.

11. An electronic device, comprising:
a video processing unit configured to generate video data by obtaining an external image;
an audio reception unit configured to receive an audio signal; and
a controller configured to extract at least one object included in the external image from the video data, determine a number of the at least one extracted object and, if the number of the at least one extracted object is one, determine a location of the at least one extracted object in the external image, and control the audio reception unit to receive the audio signal based on the at least one of the number of the at least one extracted object or the location of the at least one extracted object,
wherein controlling the audio reception unit comprises setting the audio reception unit to be non-directional when the number of the at least one extracted object is two or more.

12. The electronic device of claim 11, wherein the audio reception unit comprises a plurality of microphones.

13. The electronic device of claim 12, further comprising a touch screen configured to display the external image and a selection area for selecting the extracted object.

14. The electronic device of claim 13, wherein the touch screen is further configured to receive a selection input for the displayed selection area and to select the extracted object based on the received selection input.

15. The electronic device of claim 12, wherein the video processing unit is disposed on at least one of a front side and a rear side of the electronic device.

16. The electronic device of claim 12, wherein the controller comprises:
an object measurement unit configured to measure at least one of location information, movement information, and number information of the extracted object;
an object tracking unit configured to track and update the extracted object based on the measured at least one of location information, movement information, and the number information of the extracted object; and
an object extraction unit configured to extract the object included in the external image by tracking and updating the object.

17. The electronic device of claim 12, wherein the controller is further configured to determine if the at least one extracted object is positioned within a preset location image area.

18. The electronic device of claim 17, wherein the controller is further configured to set the audio reception unit to be unidirectional for enhancing an audio recognition ratio for the extracted object compared with an audio recognition ratio of the external image when the extracted object is positioned within the preset location image area.

19. The electronic device of claim 17, wherein the controller is further configured to set the audio reception unit to be non-directional for providing an audio recognition rate of the extracted object equal to an audio recognition rate of the external image when the extracted object is not positioned within the preset location image area.

20. The electronic device of claim 12, wherein controlling the audio reception unit further comprises controlling the audio reception unit when a call function is executed in the electronic device.

21. The electronic device of claim 12, wherein controlling the audio reception unit to receive the audio signal comprises controlling the audio reception unit when a video recording function is executed in the electronic device.

* * * * *